United States Patent [19]
Phillips

[11] Patent Number: 5,805,311
[45] Date of Patent: Sep. 8, 1998

[54] COLOR OPTICAL SCANNER WITH SINGLE LINEAR ARRAY

[75] Inventor: Wayne G. Phillips, Loveland, Colo.

[73] Assignee: Hewlett-Packard Company, Palo Alto, Calif.

[21] Appl. No.: 516,682

[22] Filed: Aug. 18, 1995

[51] Int. Cl.⁶ .................................. H04N 1/04; H04N 1/36
[52] U.S. Cl. ................ 358/500; 358/486; 358/497; 358/501; 358/505; 358/512; 358/538
[58] Field of Search ...................... 358/447, 486, 358/494, 500, 505, 512, 501, 261.3, 497, 474, 487, 514; 348/270, 269, 98, 99, 100; 355/212

[56] References Cited

U.S. PATENT DOCUMENTS

| | | | |
|---|---|---|---|
| 3,499,975 | 3/1970 | Arps | 358/486 |
| 4,641,357 | 2/1987 | Satoh | 358/475 |
| 4,709,144 | 11/1987 | Vincent . | |
| 4,809,062 | 2/1989 | Chen | 358/512 |
| 4,864,415 | 9/1989 | Beikirch et al. | 358/447 |
| 4,866,512 | 9/1989 | Hirosawa et al. | 358/494 |
| 5,091,789 | 2/1992 | Haneda et al. | 358/501 |
| 5,232,216 | 8/1993 | Bybee . | |
| 5,300,767 | 4/1994 | Steinle et al. . | |
| 5,336,878 | 8/1994 | Boyd et al. | 358/514 |
| 5,339,107 | 8/1994 | Henry et al. | 358/270 |
| 5,373,374 | 12/1994 | Traino et al. | 358/505 |
| 5,410,347 | 4/1995 | Steinle et al. | 358/512 |

*Primary Examiner*—Edward L. Coles
*Assistant Examiner*—Mark Wallerson

[57] ABSTRACT

An optical scanning device is disclosed that generates data representative of a color image of an object using only one linear photosensor array. Image data corresponding to two or more color components is collected by making multiple incremental, reciprocal displacements of a scanning head with a different filter or other color selection mechanism in place during different incremental displacements. By traversing the scanned object in a series of reciprocal movements, color component data corresponding to relatively small portions of the scanned object is sequentially collected in and then removed from dynamic memory. As this data from each path segment is removed from dynamic memory, it is processed to place it in a correlated form representative of a polychromatic image of that path segment and is then stored in an ordered array in another, typically longer term, memory device such as a hard disk.

30 Claims, 13 Drawing Sheets

COLOR OPTICAL SCANNER WITH SINGLE LINEAR ARRAY

BACKGROUND OF THE INVENTION

The present invention relates generally to color optical scanners and, more particularly to color optical scanners which employ a single line optical sensor array.

Color optical scanners are similar to black and white and gray scale optical scanners in that data representative of a scanned document (object) is produced by projecting an image of the scanned document onto an optical sensor. The optical sensor includes a plurality of cells or "pixels" which produce data signals representative of the intensity of the light impinged thereon. These data signals are typically digitized and stored on appropriate data storage media. Such stored data may later be used, as for example through a personal computer and computer monitor, to produce a display image of the scanned object. The image of the scanned object is projected onto the optical photosensor array incrementally by use of a moving scan line. The moving scan line is produced either by moving the document with respect to the scanner optical assembly or by moving the scanner optical assembly relative to the document.

In a stationary flat bed scanner, an object to be scanned, usually a paper document, is placed on a transparent plate. A scan bar is moved underneath the plate and document. The scan bar is associated with an optical system that focuses light from the document onto a row or "linear array" of optical sensors. The scan bar often includes a light source which illuminates the object. At any given time, one line across the width of the document which is spanned by the scan bar is imaged on the row of sensors. This line is referred to herein as a "scan line" or "object scan line", and it is moved along the length of the object as the scan bar moves.

The object scan line comprises a plurality of "object pixels" or simply "pixels" which correspond to the pixels on the optical sensor.

In a moving flat bed scanner, an object is again placed upon a transparent plate and a scan bar is positioned below the plate and object. However, in this type scanner, the scan bar remains stationary and the plate and the object supported on it are moved in order to move the scan line across the document.

Another type of scanner is a scroll feed scanner. In this scanner design, the scan bar remains stationary while a system of mechanical rollers moves the document to be scanned past the scan bar.

Finally, some stationary flat bed scanners have a scroll feed automatic document feeder option such as that described in U.S. Patent application Ser. No. 902,638 filed Jun. 23, 1992 for SHEET FEEDING APPARATUS FOR FLATBED OPTICAL SCANNERS of J. Bybee, now U.S. Pat. No. 5,232,216 which is hereby specifically incorporated by reference for all that it discloses. When the automatic document feeder option is used, the scan bar moves to a precisely defined location under the document feeder and remains stationary. During scanning, the document feeder moves the document past the scan bar in the same manner as a scroll feed scanner.

Color optical scanners differ from black and white scanners in that multiple color component images of an object must be collected and stored to produce a color display image of the object. Typically data representative of red, green and blue component color images of the scanned object are produced and correlated for storage.

Various techniques are used in color optical scanners for collecting data representative of multiple component color images.

One technique, such as described in Vincent, U.S. Pat. No. 4,709,144 and Boyd, et al., U.S. Pat. No. 4,926,041, which are both hereby specifically incorporated by reference for all that is disclosed therein, is to split a polychromatic scan line light beam into multiple color component beams which are projected onto multiple linear photosensor arrays. For example an imaging beam from the same narrow scan line region of a document is split into red, green and blue component beams which are then simultaneously projected onto separate linear photosensor arrays. Using this technique the component color image data generated from any particular scan line is generated simultaneously and is thus easily stored in a correlated form.

Another technique for generating multiple color component images from a polychromatic light beam is to simultaneously project light from different scan line regions of a document onto separate linear photosensor arrays such as described in Takeuchi, R. et al. (1986) "Color Image Scanner with an RGB Linear Image Sensor," SPSE Conference, The Third International Congress On Advances in Non-Impact Printing Technologies, PP339–346, August 1986, which is hereby specifically incorporated by reference for all that it discloses. Using this technique it is necessary to perform data manipulation to correlate the data representative of different scan line component images since the different component color images of any scan line region of the document are generated at different times. A variation on this technique which allows image scaling is described in U.S. Patent application, Ser. No. 08/060,289 filed May 10, 1993 for VARIABLE SPEED SINGLE PASS COLOR OPTICAL SCANNER of Boyd and Degi, now U.S. Pat. No. 5,336,878 which is hereby incorporated by reference for all that it discloses.

Another scanning technique is to project imaging light onto a single linear sensor array during multiple scanning passes using differently colored illumination sources. For example a document is first scanned using only red light, then only green light and finally only blue light. In a variation of this technique three scanning passes are made using a white light illumination source but the imaging light is filtered before it enters the sensor array with a different color filter during each of the three passes.

One cost saving advantage of such a multiple pass color optical scanner is that is requires only a single linear sensor array rather than the multiple linear sensor arrays used in some scanning techniques. However, a disadvantage of this technique is that a computer receiving the digitized data from the scanner must store all of the data from at least two of the scanning passes before it can begin assembling the color component data and processing it. Thus, this technique usually requires a relatively long period of time to generate the combined data representative of a color image because of the data processing time needed to assemble the color component data after the last scanning pass. Also, this technique requires a large amount of buffer memory in the computer which performs the image data processing or, alternatively requires buffer storage to be provided on an associated disk drive which further increases the processing time.

Another disadvantage of the three pass color scanning technique is that it is usually impractical for scroll feed scanning. This is because the object which is scanned, usually a paper document, must be scroll fed past a stationary scan bar three times. It is necessary for the scan lines on each pass to coincide and thus, the position of the document must be precisely repeated for each pass. This is extremely difficult to accomplish in a scroll feed assembly due to inherent slippage between the document and feeder which may occur during initial document positioning and during the scanning pass movement.

Various types of photosensor devices may be used in optical scanners. Currently the most commonly used photosensor device for optical scanners is the charge coupled photosensor device or "CCD". A CCD builds up an electrical charge in response to exposure to light for a preset period of time known as a sampling interval. The size of the electrical charge built up is dependent on the intensity and the duration of the light exposure during the sampling interval.

In optical scanners CCD cells are aligned in linear arrays. Each cell or "pixel" has a portion of a scan line image impinged thereon as the scan line sweeps across the scanned object. The charge built up in each of the pixels is measured and then discharged at the end of each sampling interval. In most optical scanners the sampling intervals of the CCD arrays are fixed. A typical CCD sampling interval is 4.5 milliseconds.

As previously mentioned, an image of the scan line which moves across a scanned document is projected onto the scanner's linear sensor array by scanner optics. The scanner optics usually comprise an imaging lens which typically reduces the size of the imaged scan line from that of the object scan line considerably, e.g. by a ratio of 7.9:1.

As used herein, "imaged scan line" or "image scan line" refers to the image of the object scan line which is projected onto the linear photosensor. Both the imaged scan line and the object scan line are often referred to in the industry as simply "scan line".

SUMMARY OF THE INVENTION

The present invention is directed generally to a color optical scanning device which enables multiple pass color optical scanning to be efficiently accomplished without the need for an extensive amount of buffer memory.

To accomplish this multiple pass scanning, an object, such as a document, is divided into segments and scanned in a series of reciprocal movements. Each movement acquires one monochrome component of the color image of one of the segments. The data for each monochrome component is stored in a dynamic or buffer memory. When all of the monochrome components for a segment have been acquired, they are then correlated and stored in array form to represent the color image of that particular segment. This correlated data may then be stored in a separate, longer term memory device such as a hard disk thus freeing up the buffer memory to receive color component data from the next segment. The process is then repeated for each segment of the object.

Using this technique, only enough buffer memory need be provided to store image data from one segment, rather than from the entire document. Accordingly, a method and apparatus are provided which overcome the previously described disadvantages regarding slow processing times and large buffer memory storage requirements.

The color optical scanning device may acquire image data only during one direction of reciprocal movement, or it may acquire data in both directions. The device may be a stationary flat bed type scanner, a moving flat bed type scanner, a scroll feed type scanner or a stationary flat bed type scanner having a scroll feed automatic document feeder as previously described.

BRIEF DESCRIPTION OF THE DRAWINGS

An illustrative and presently preferred embodiment of the invention is shown in the accompanying drawing in which.

DETAILED DESCRIPTION OF THE INVENTION IN GENERAL

Figure 6:
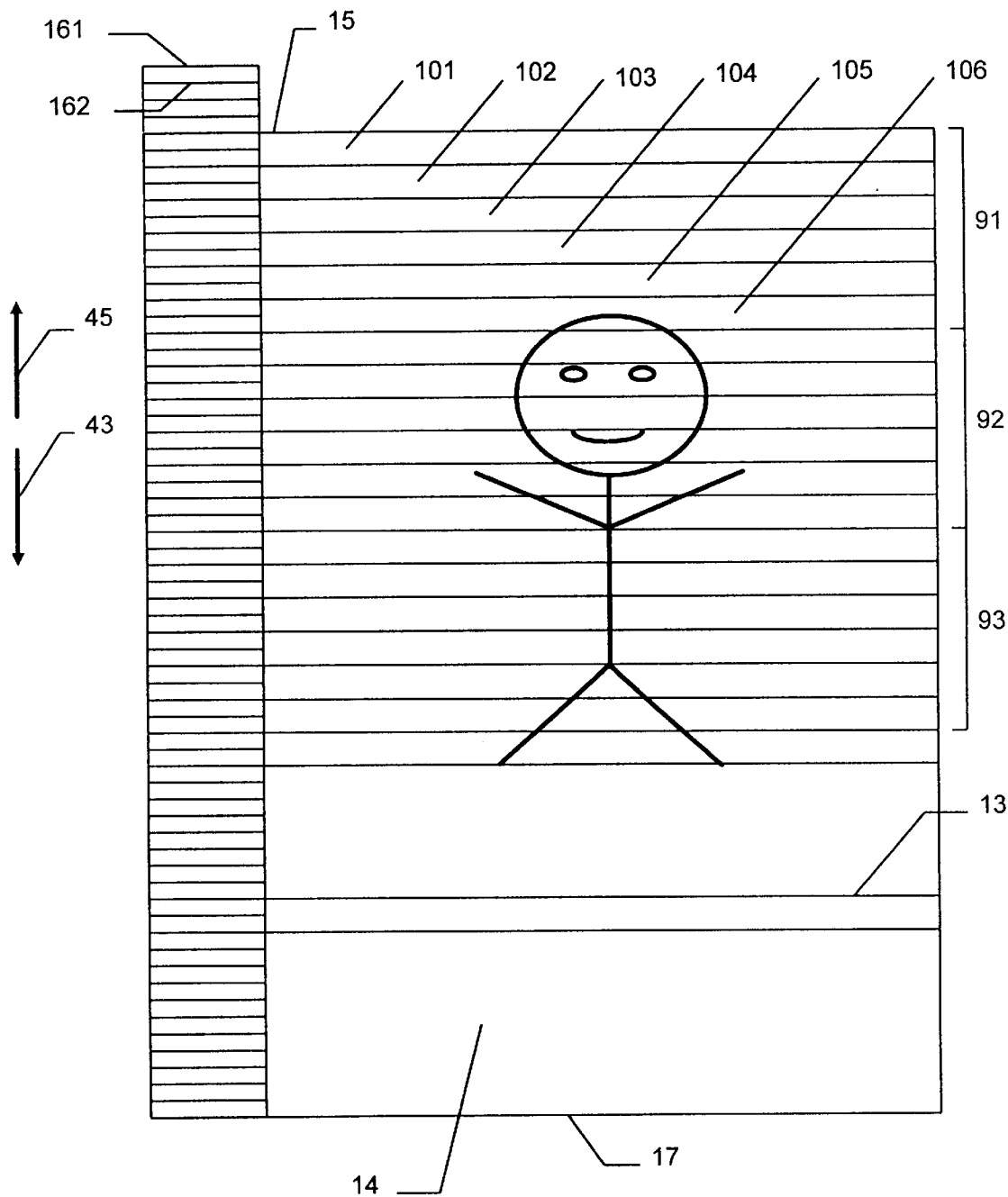
FIG. 6 is a plan view, looking upward, of a document which is being scanned by an optical scanner device and which schematically illustrates the movement of a scan line across the document.
Figure 7:
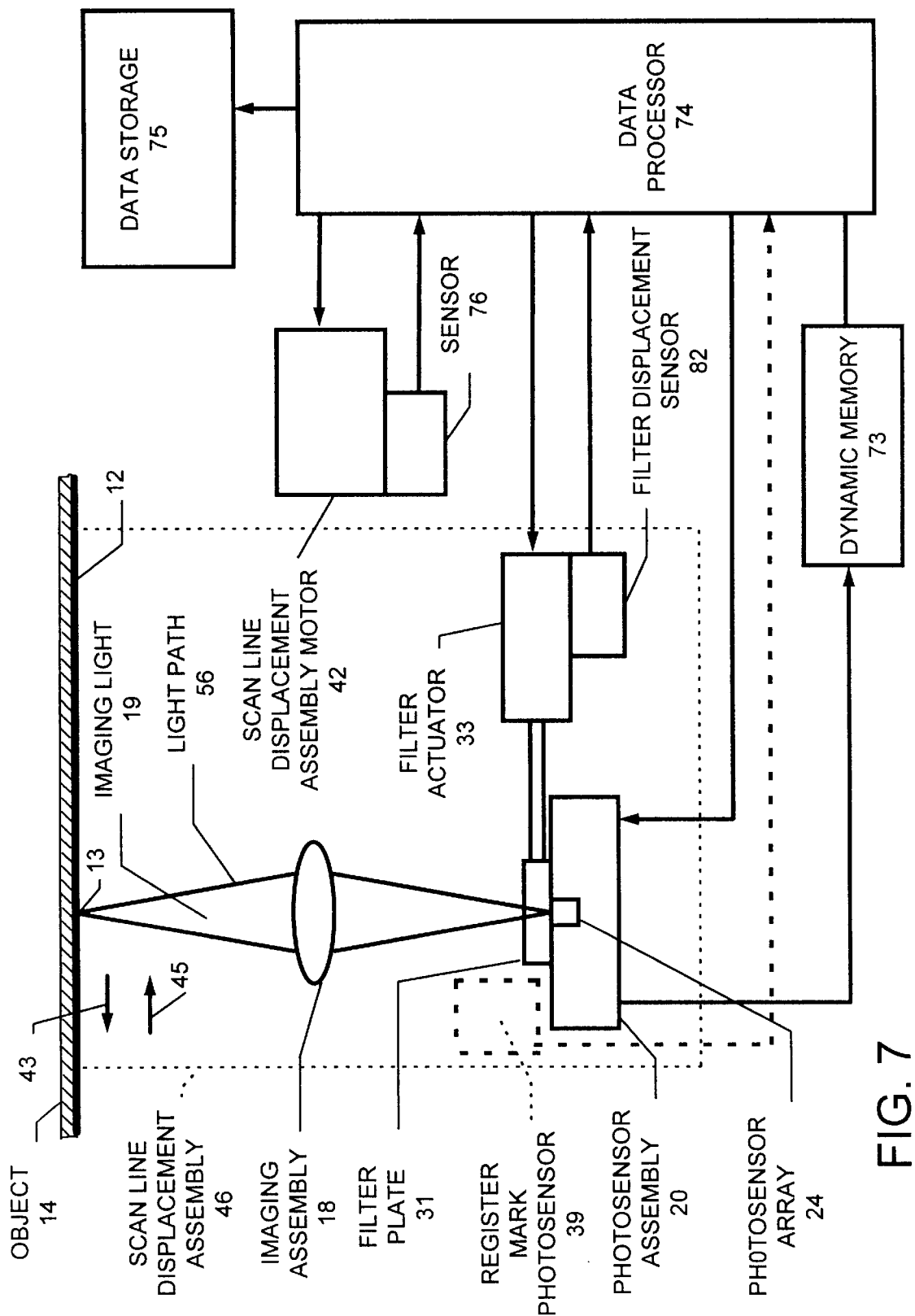
FIG. 7 is a schematic illustration of a control system for an optical scanner device.

FIGS. 6 and 7 illustrate, schematically, the general construction and operation of a color optical scanner device 10 for generating data, from imaging light 19 that is imaged on a photosensor array 24, which is representative of a color image of a scanned object 14. A plurality of band portions or segments 91, 92, 93, etc. are defined along the length of a scanning path. A scan line displacement assembly 46 is provided which may include a photosensor array 24 and an imaging assembly 18 such as a lens which defines an imaging light path 56 arranged between a scanned object 14 and the photosensor array 24. A color selection mechanism 31, such as a filter plate, is located within the light path 56. The scan line assembly 46 is movable along the scanning path in a series of reciprocal movements within each segment 91, 92, 93, etc.

In operation, the color optical scanner device 10 generates data from imaging light 19 imaged on the photosensor array 24 representative of a color image of the scanned object 14 by displacing a scan line 13 from a first end 15 to a second end 17 of a scanning path. The scan line is displaced in a plurality of reciprocal movements in each of the plurality of segments 91, 92, 93, etc. of the scanning path. The color of the imaging light 19 which is imaged on the photosensor array 24 is changed in accordance with the reciprocal movements.

Having thus described the color optical scanner device 10 of the present invention in general, certain exemplary structure of one embodiment of an optical scanner 10 will now be described in detail.

SCANNER STRUCTURE

FIGS. 1–3 and 7 illustrate a stationary, flat bed optical scanner device 10 which is adapted for producing machine readable data representative of a color image of a scanned object 14 such as a sheet of paper with graphics provided thereon as illustrated in FIG. 6. The object 14 which is to be scanned may be supported on a transparent plate 12 located on the upper panel of the scanner device. The scanner device includes a light source assembly 16 for illuminating object 14 and also includes an imaging assembly 18, such as a conventional scanner lens assembly, (shown schematically in FIG. 7) for focusing imaging light 19 from scan line 13 on object 14 onto a linear photosensor array 24 of a photosensor assembly 20 so as to provide an image 11, FIG. 4, of the scan line 13 portion of the object on the photosensor array 24.

Figure 4:
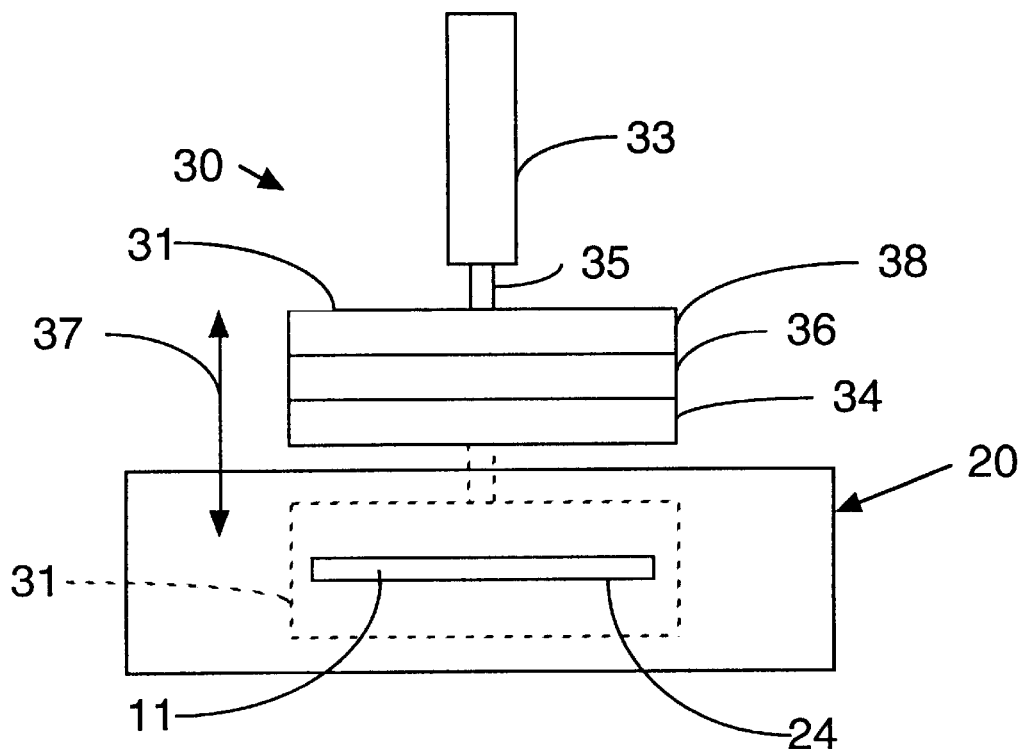
FIG. 4 is a plan view of a photosensor assembly and filter assembly employed in the optical scanner device of FIGS. 1–3.
Figure 5:
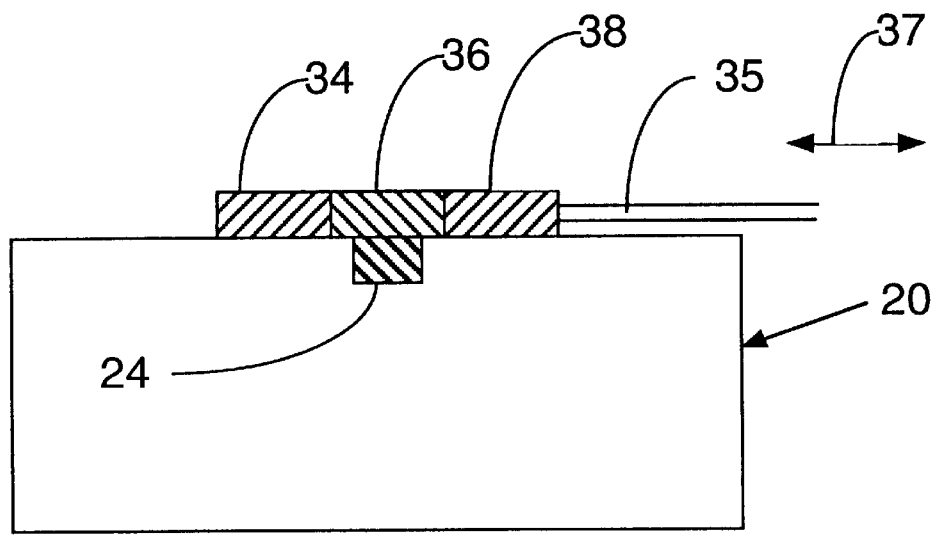
FIG. 5 is a cross-sectional elevation view of the photosensor assembly and filter assembly of FIG. 4.

The photosensor assembly 20 of the scanner device operates in successive sampling intervals and generates image data representative of the scan line images which are successively focused on associated photosensor array 24. The photosensor assembly 20 may be a CCD photosensor unit. As illustrated by FIGS. 4 and 5, the photosensor assembly 20 includes a linear photosensor 24 having a predetermined photosensor line width (pixel width), e.g. 8 microns (0.000315 inches), which is located at the focus of the imaging assembly 18 (which in one preferred embodiment is a planar region) and which generates a data signal representative of the intensity of imaging light 19 which is impinged thereon.

First, second and third color filters 34, 36, 38 on a filter plate 31 may be mounted on the arm 35 of a reciprocal actuator 33 for movement in directions 37. The filters are operably associated with the linear photosensor 24 for filtering imaging light focused on the linear photosensor in successive intervals such that the linear photosensor 24 receives only light of a first preselected color, e.g. red, during a first filter period in which first filter 34 is opposite linear array 24, receives only light of a second selected color, e.g. green during a second filter period in which filter 36 is opposite array 24; and receives only light of a third preselected color, e.g. blue during a third filtering period, during which filter 38 is opposite array 24.

The scanner may also be operated in black and white or gray scale modes during which plate 31 is not in covering relationship with linear photosensor array 24, as shown in FIG. 4.

When operating in the black and white or gray scale modes with the filter plate displaced from the photosensor array 24, the array 24 receives approximately three times as much imaging light as it does when covered with one of the red, green, or blue filters. As a result, the scanner may be operated to acquire data about three times as fast in the black and white or gray scale operating modes as in the color operating mode. This increased speed of operation in the black and white or gray scale modes is one significant advantage of the present scanner design over most conventional color optical scanners.

The photosensor assembly 20 and associated filters 34, 36, 38 may be of a type identical to that described in detail in U.S. patent application, Ser. No. 869,273, of Michael John Steinle and Steven Lawrance Webb for COLOR IMAGE SENSING ASSEMBLY WITH MULTIPLE LINEAR SENSORS AND ALIGNED FILTERS filed Apr. 15, 1992, now U.S. Pat. No. 5,300,767, which is hereby specifically incorporated by reference for all that it discloses, except that the photosensor assembly 20 has only a single linear array.

Figure 1:
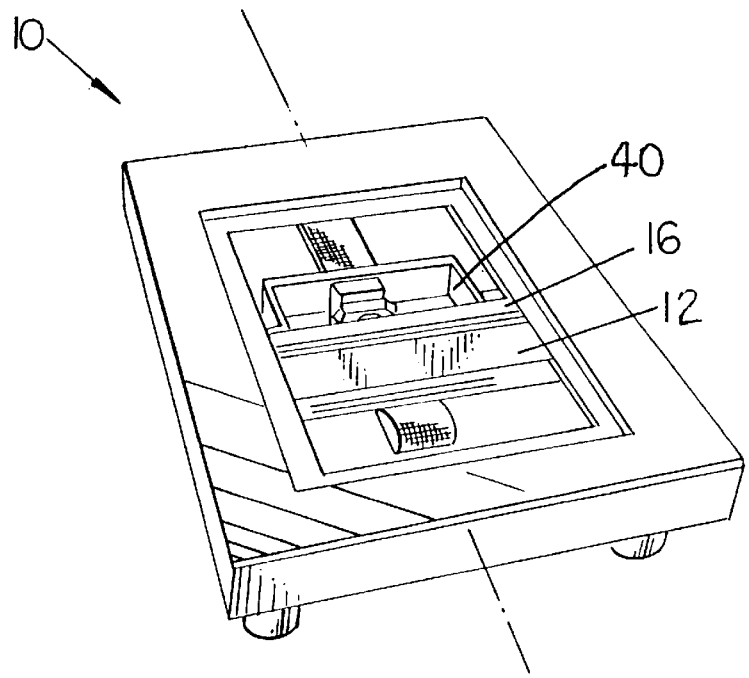
FIG. 1 is a perspective view of an optical scanner device.
Figure 2:
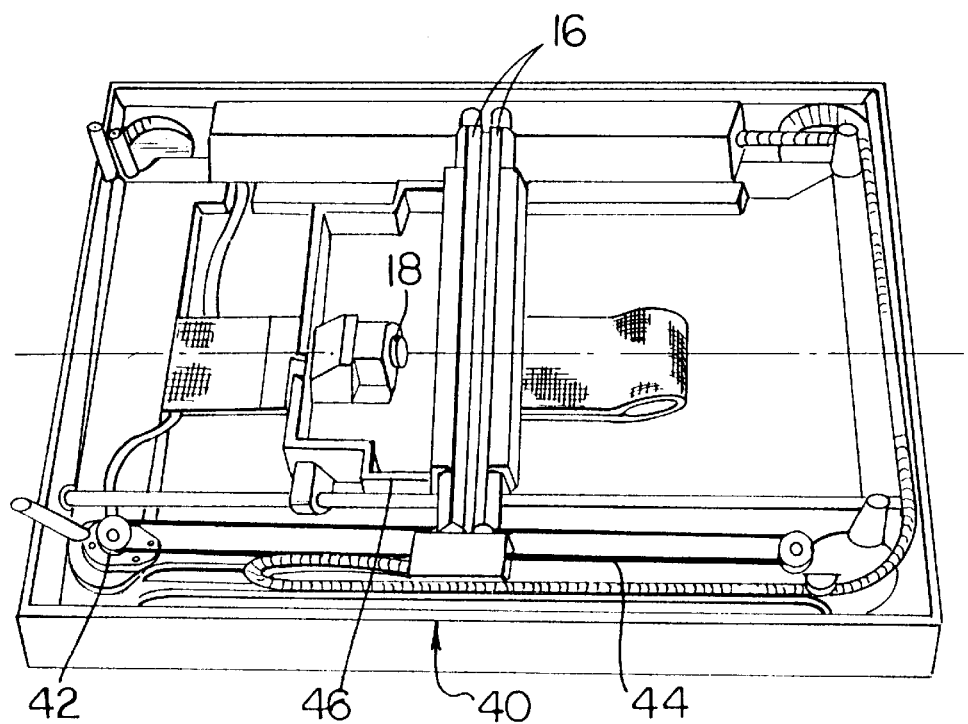
FIG. 2 is a perspective view of the optical scanner device of FIG. 1 with the top panel removed.

The optical scanner device 10 may include a displacement assembly 40, FIG. 2, which includes a drive motor 42, a drive belt 44 and a carriage assembly 46. The drive motor 42 is adapted to drive the carriage assembly 46 in a series of short reciprocal movements as it progressively moves from one end of plate 12 to the other as described in further detail below.

Figure 3:
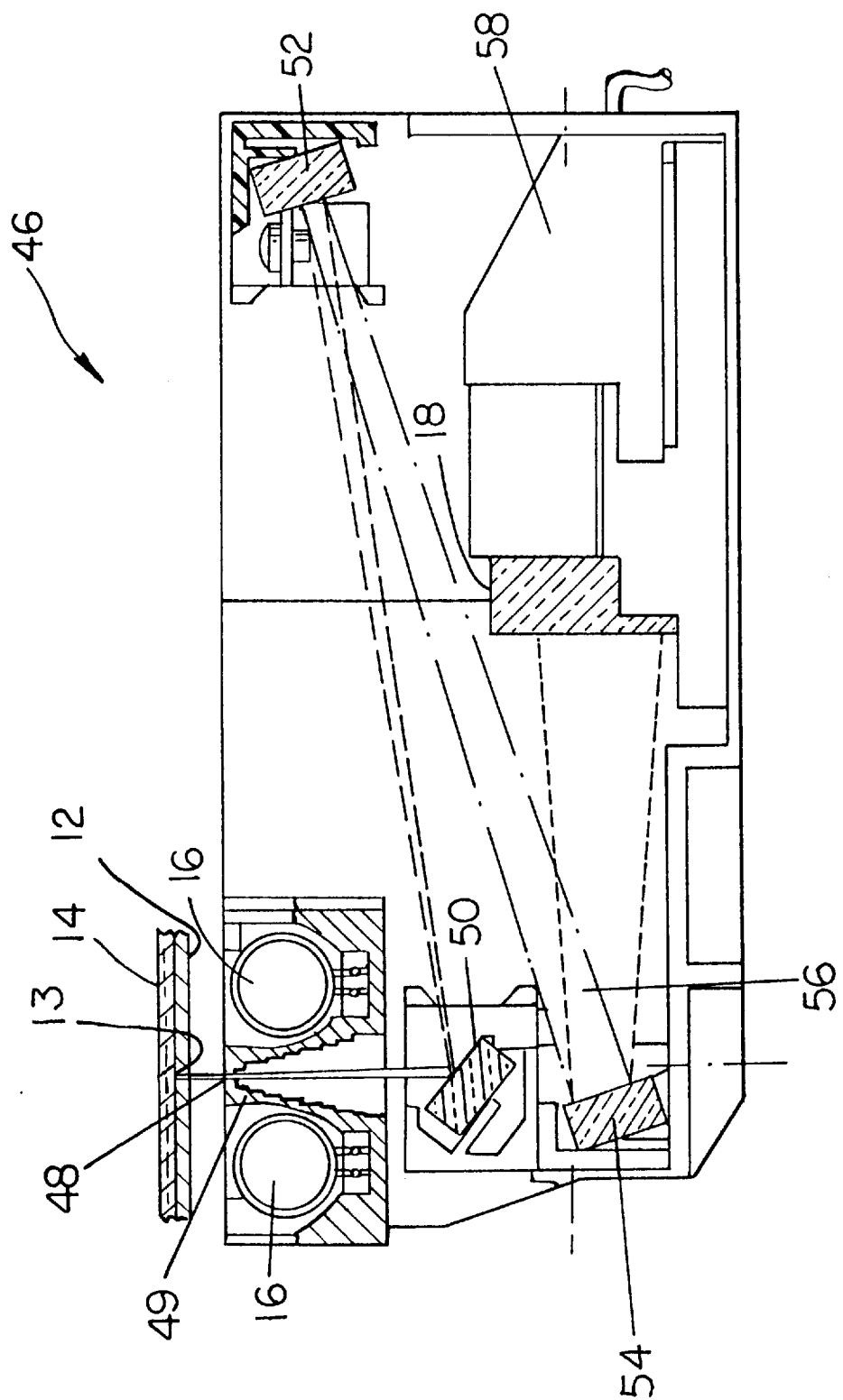
FIG. 3 is a cross-sectional elevation view of a carriage portion of the optical scanner device of FIGS. 1 and 2.

The carriage assembly 46 may support light source 16, FIG. 3, imaging assembly 18 and photosensor assembly 20, FIG. 7, therewithin. The carriage assembly 46 may also support a light slit 48 defining structure 49, FIG. 3. The light slit defining structure 49 may also support the light source 16 which may comprise a pair of fluorescent bulbs. The light slit 48 is sufficiently wide to provide an image 11 at least as wide as linear photosensor array 24. A plurality of mirrors 50, 52, 54 may also be provided within the carriage assembly so as to provide a folded imaging light path 56 (shown schematically as a linear path in FIG. 7) extending from the currently scanned portion 13, FIGS. 3, 6 and 7, of the object 14; through the light slit 48; thence from mirror 50 to mirror 52 to mirror 54, and thence, through imaging assembly 18 to photosensor assembly 20. Photosensor assembly 20 may be provided within a shroud member 58 supported by the carriage assembly 46, FIG. 3.

The carriage assembly 46 is displaced relative to transparent plate 12, and the object 14 supported thereon, to produce a sweeping scan image of the object at the linear photosensor 24. Thus, in this embodiment, the carriage assembly acts as a scan line displacement assembly which moves scan line 13 from one end 15 of object 14 to the other end 17, FIG. 6. The carriage assembly 46 progresses in a primary scan direction 43 through a series of reciprocating movements in both primary scan direction 43 and secondary (reverse) scan direction 45 as described in further detail below.

CONTROL SYSTEM

As illustrated in FIG. 7, the control system for the scanner device includes a data processor 74 which receives inputs from various components of the optical scanner, processes these inputs, and provides output commands to various operating components of the scanner as will be described in further detail below.

The processing performed by the data processor 74 may be performed through the use of hard-wired electronic components, or through the use of a computer and associated computer programs provided in software or firm ware, or may be processed by using a combination of such data processing techniques. The data processor 74 receives an input signal from a scan line displacement sensor 76 which is indicative of the displacement of scan line 13 across the scanned object 14 in both a primary scanning direction 43 and secondary scanning direction 45.

Figure 8:
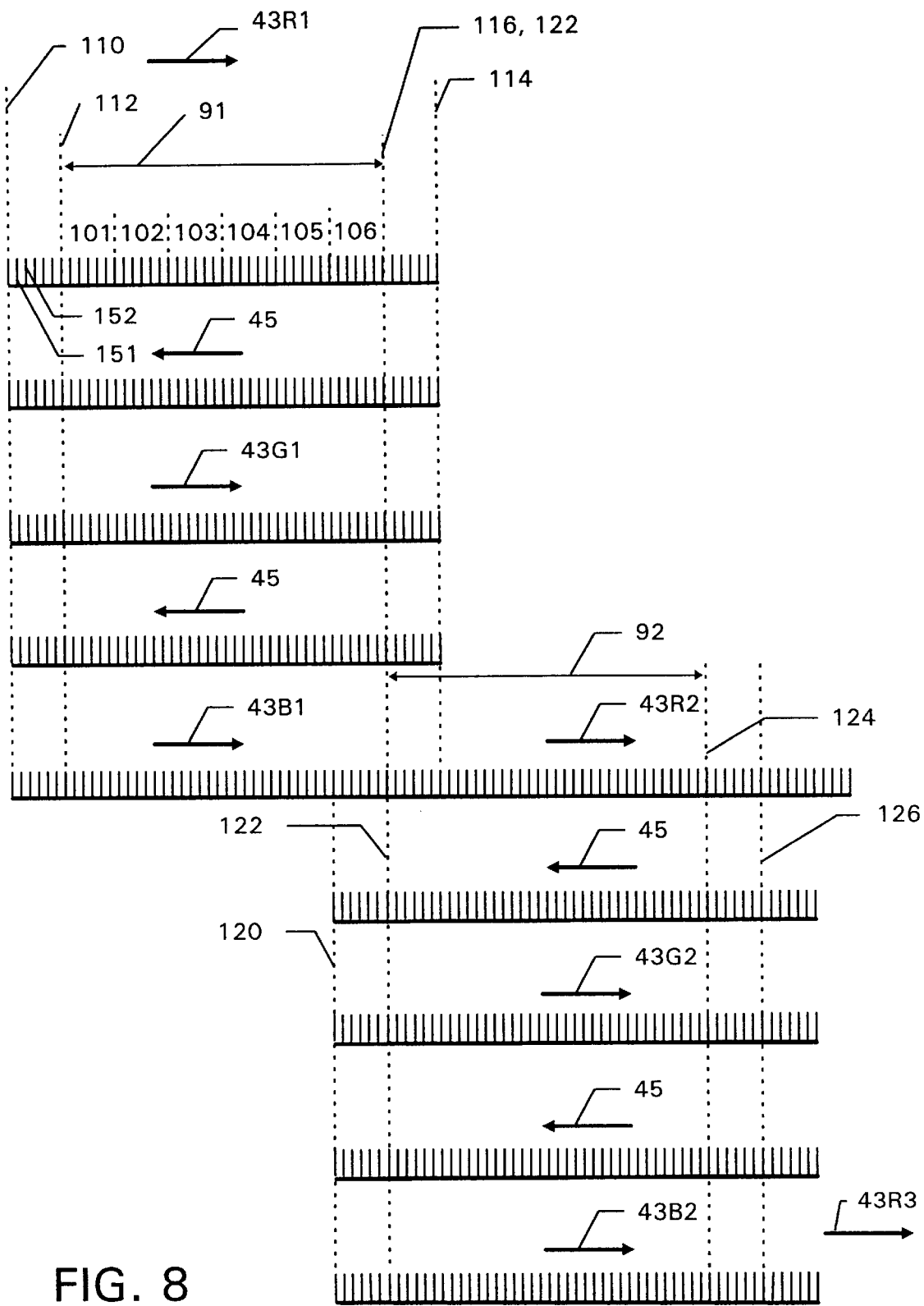
FIG. 8 is a schematic illustration showing a series of scan line reciprocal movements across two succeeding band portions of a document in which color component data is collected during scan line movement in only one of the two reciprocal directions.

The scan line displacement sensor 76 may comprise a conventional optical encoder unit mounted on a shaft of the scan line displacement assembly drive motor 42 which provides a displacement signal consisting of a plurality of motor encoder pulses 151, 152, etc., FIG. 8, which are representative of units of displacement of the scan line 13 across document 14. In a typical embodiment, each encoder pulse 151, 152 might represent a distance of scan line displacement of about 1/600 of an inch.

Alternatively, the scan line displacement sensor may comprise an optical sensor unit 39, FIG. 7, that is mounted on the carriage assembly 46 and which provides a displacement signal based upon the detection of a plurality of marks such as the marks 161, 162 schematically illustrated in FIG. 6. These marks may be located on any stationary surface of the scanner device, such as the bottom of transparent plate 12. Photodetectors for detecting registration marks are well known in the art. A separate photodetector may be used as the registration mark sensor 39 or alternatively an end portion of linear photosensor 24 may be used for detecting registration marks.

The data processor 74 may also receive an input signal from a filter displacement sensor 82 which is indicative of the position of filter plate 31 and is thus indicative of the particular color filter 34, 36 or 38, FIGS. 4 and 5, which is currently positioned opposite the linear photosensor array 24.

The data processor 74 also receives a data signal from the photosensor array 24 which is indicative of the color component image which has been focused on the linear photosensor array 24 by the imaging assembly 18.

Prior to processing by data processor 74, the information in the data signal from the photosensor array 24 is stored in the dynamic memory 73, typically random access memory, which may be an integral component of the data processor or may be a separate memory device such as an operably connected RAM integrated circuit. The data processor 74 may be the data processor of a connected personal computer, such as an Intel Pentium chip based computer, or may be a separate dedicated data processor provided on the scanner.

The data processor 74 processes the various inputs as will be described in further detail below and provides output command signals in response thereto to control the operation of various scanner components. The data processor 74 provides a control signal to the scan line displacement assembly drive motor 42 to control the displacement of scan line 13 across document 14. The data processor also provides a control signal to filter actuator 33 to control the color filter which is currently positioned opposite the photosensor array 24. The data processor 74 also provides a control signal to the photosensor assembly 20 to initiate data collection from each band portion 91, 92, 93, etc. of the document, FIG. 6, as described in further detail below.

The operation of the control system in one embodiment of the invention in which data input from the document takes place only when the scan line 13 is moving in the primary scan direction 43 will now described with reference to FIGS. 8–11B.

Figure 11A:
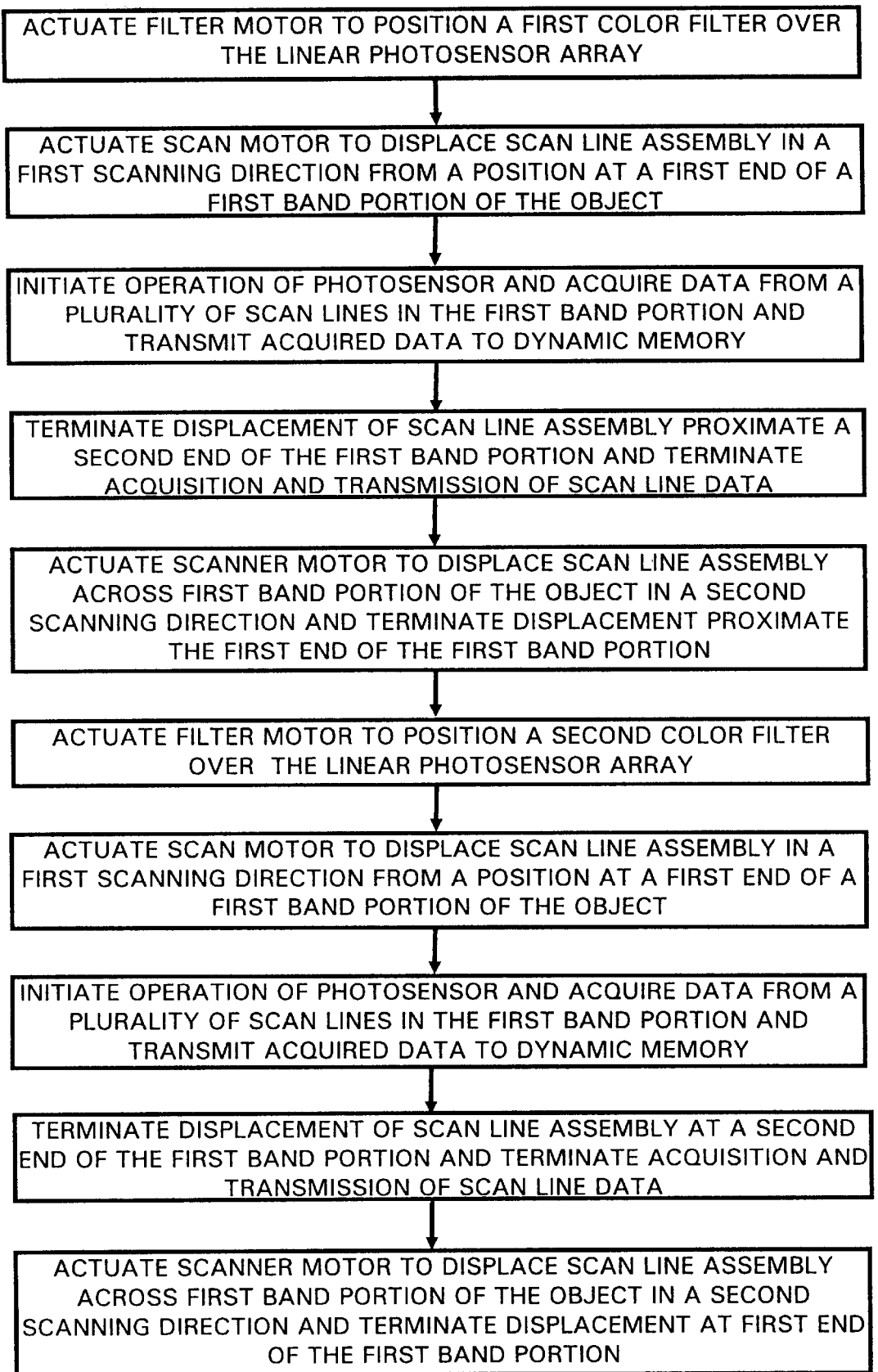
FIG. 11A is a flow chart illustrating the basic operations performed by the data processor of FIG. 7 in a scanning operation of the type illustrated in FIG. 8.
Figure 11B:
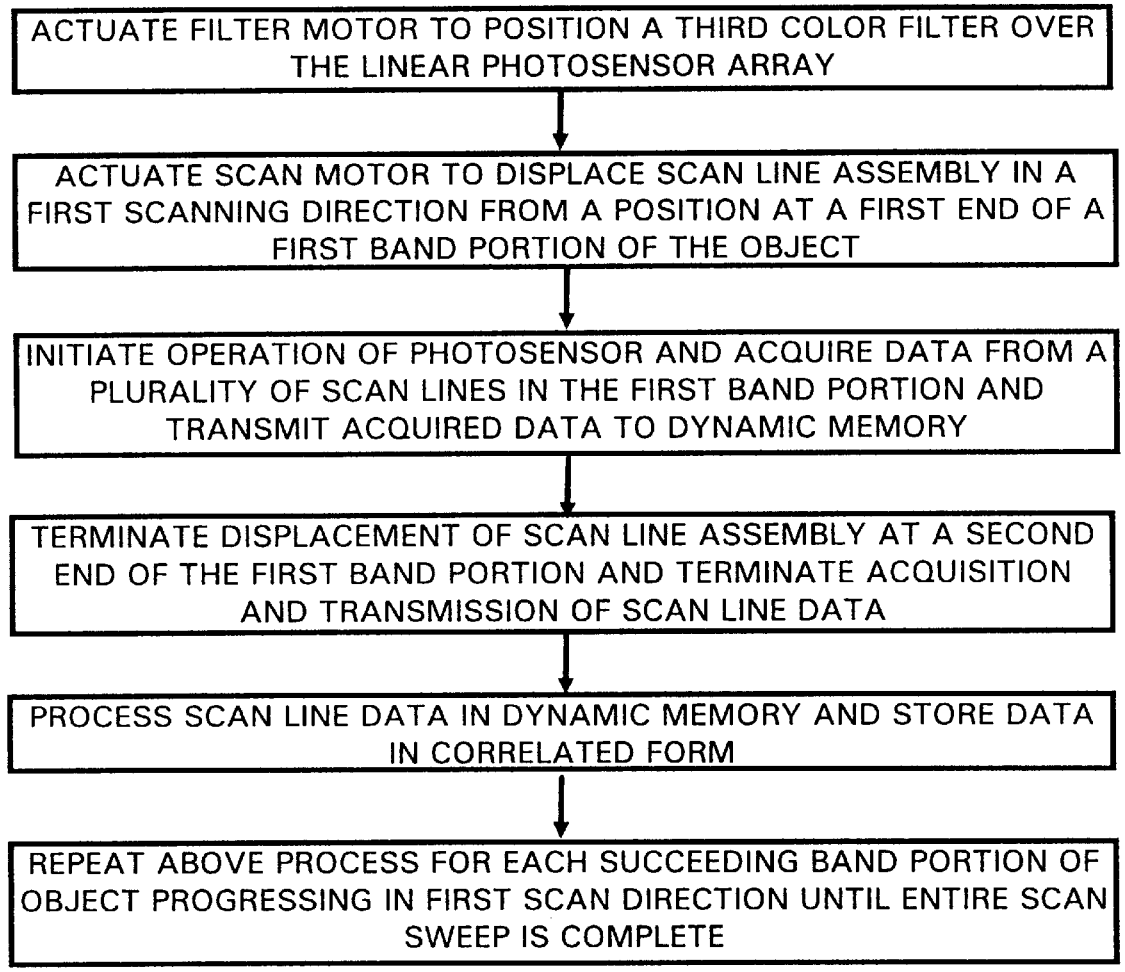
FIG. 11B is a continuation of the flow chart of FIG. 11A.

FIGS. 11A and 11B describe, in general, an operation in which the scan line 13 is displaced across a series of adjacent band portions (also referred to herein as segments) such as 91, 92, 93 of the object 14 in a number of reciprocal scanning cycles which is equal in number to the number of color component images which are to be generated. Most color optical scanners generate only three component images of an object which is scanned because only three such images are necessary to produce a polychromatic image of an object. (Nevertheless, it is to be understood that, although an embodiment which generates only three color component sets of data is described herein, the invention is not to be limited to a three-component color optical scanner and includes an optical scanner which generates only two color component images as well as an optical scanner which generates four or more color component images.)

The data processor 74 next generates commands to displace the scan line 13 across a band portion in the primary scan direction 43 during a first color component scan of the band region, e.g., a red color component scan as indicated by the reference numeral "43R1" in FIG. 8. The data processor 74 initially actuates the filter actuator 33 to move the red filter portion 34 of the plate over the photosensor array 24. The data processor 74 also actuates the photosensor assembly 20 at the beginning of the red component scan and thus, the photosensor assembly 20 generates image data representative of a red color component image of band region 91.

Band region 91 has a width which is typically more than one scan line width, but less than the width of the entire document. A region on the document which is one scan line wide is referred to herein as a "scan line portion of an object" or simply as a "scan line" or "line". (It is to be understood that "scan line" when used in this sense, represents a fixed area on the document as opposed to a moving illuminated portion of the document which is currently being imaged on the linear photosensor array which is also referred to herein and in the art as a "scan line".) In the schematic embodiments of FIGS. 6 and 8–10, each band portion 91, 92, 93, etc. is indicated to be six scan lines wide, e.g., the band 91 contains the six scan lines 101, 102, 103, 104, 105, 106. Band 91 is located between reference numerals 112 and 116 in FIG. 8. The next band 92 contains the next six scan lines on the document, located between reference numerals 122 and 124 in FIG. 8. The next band contains the next six scan lines on the document, etc. It is to be understood that this number of scan lines has been chosen for illustrative purposes. In a more typical example, there could be 50 scan lines each having a scan line width of 1/300 of an inch in each band 91, 92, 93.

At the beginning of the red sweep 43R1, the scan line 13 is positioned at a location indicated by reference numeral 110 in FIG. 8. The scan line 13 is initially positioned at a point before the beginning of first band region 91 to allow for initial acceleration of the scan head to ensure that the entire band region 91 is scanned at the same scanning velocity.

As the scan line 13 moves across the first band region 91 in its red pass, as indicated at 43R1, it sends data to a dynamic memory device 73 which stores the data in an array ordered by scan line and the pixels in each scan line. This ordered data array may be envisioned as a plane containing scan lines ordered in rows and pixels ordered in columns and including all red component image data as illustrated by the first plane in FIG. 9.

At the end of the red sweep indicated at 43R1, the scan line has moved slightly past the first band portion of the object to a location indicated by reference numeral 114 in FIG. 8. The first band region is scanned at a constant scanning velocity and this "over shoot" of the first band region occurs as the scan head is decelerating after passing over the entire first band region.

The scan bar is next moved in the secondary scanning direction 45, i.e., the direction opposite direction 43, until it is returned to the position 110 which it occupied at the beginning of the 43R1 scan sweep. No data is collected during movement in direction 45 and thus, in one preferred embodiment of the invention, photosensor array 24 is de-actuated during the movement in direction 45. Alternatively, photosensor array 24 may continue to operate but the data stream therefrom is controlled in a manner such that it does not enter dynamic memory 73.

Next, the green filter plate portion 36 is moved into position over photosensor array 24 and the photosensor assembly 20 is again actuated or the data stream therefrom is re-connected to dynamic memory 73 such that data is collected during a green scanning pass as indicated at 43G1 in FIG. 8. Green scanning pass 43G1 is identical to the red pass except for the fact that a green filter 36 rather than a red filter 34 is positioned over the linear photosensor array. At the end of the green pass, the scan line 13 is again returned to the starting point 110 and a blue pass, which is identical to the red pass and the green pass except for the color of the filter, is initiated.

At the end of the blue pass, the displacement of the scan line is stopped. Rather than being returned to the beginning of the first band portion, however, scan line 13 it is only moved back a small distance such that it is positioned at a location 120 in front of the second band portion 92.

The locations of the scan line 13, the band region scan line starting and stopping points (e.g., 110, 114, 120, 126, FIG. 8) and the band region beginning and ending points (e.g., 112, 116, 122, 124, FIG. 8) are determined by monitoring the encoder pulses such as the encoder pulses 151, 152, etc. shown schematically in FIG. 8. The encoder resolution is preferably selected such that each scan line 101, 102, 103, 104, 105, 106, etc. is multiple, e.g., 10 encoder pulses wide.

As previously mentioned, rather than using a drive motor mounted encoder 76, a register mark sensor 39 which senses register marks 161, 162, etc., FIG. 6, associated with the scanned object 14 may be used for determining the beginning and end of each band region. Or, more preferably, a combination of register mark sensing and encoder pulse counting could be used. For example, movement of the scan line could be stopped a predetermined number of encoder pulses after the sensing of register marks defining the beginning and end of each band portion. Many other triggering arrangements for controlling scan bar displacement might also be employed and are within the scope of the invention.

Similarly, methods for determining scan line displacement other than counting of encoder pulses could be employed. For example, rather than using a closed loop system as illustrated in FIG. 6, an open loop system could be adopted by using a stepper motor to drive the scan line displacement assembly 46. In such a system, a control command from the data processor dictates the number of "steps" which the stepper motor is to move to achieve a desired displacement of the scan line displacement assembly and the appropriate number of current pulses are generated to move the motor through the required number of steps. No feedback from the stepper motor to the data processor 74 is required.

Figures 9, 10:
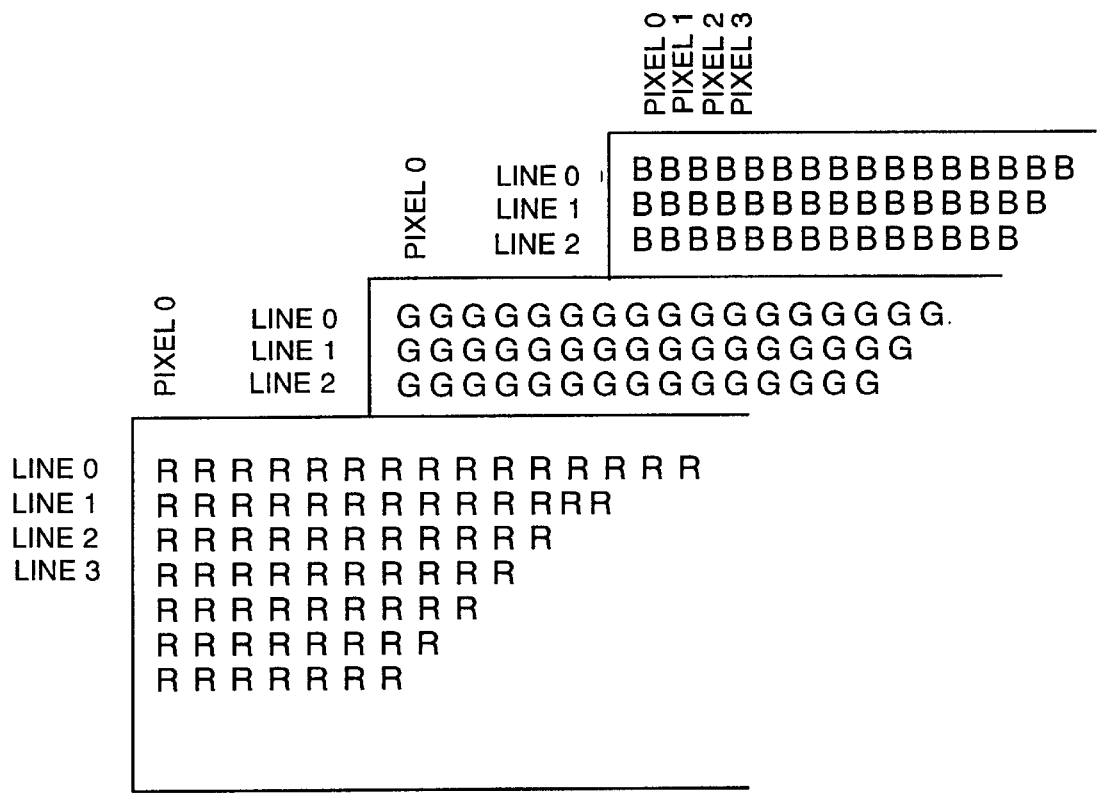
FIG. 9 is a schematic representation of the manner in which scan line data from successive scan lines in a single band region of a document is stored prior to data processing.
FIG. 10 is a schematic illustration of the manner in which scan line data shown in FIG. 9 is stored subsequent to data processing.

At the end of the three color passes 43R1, 43G1, 43B1, data from the six scan lines in band 91 will have been stored in memory in three separate arrays with the red data stored in a first array, the green data stored in a second array, and the blue data stored in a third array as represented schematically by the three planes in FIG. 9, with "Line 0" indicating the data from line 101, "Line 1" representing data from line 102, etc.

Once the three colored sweeps of the first band have been completed, the data processor 74 begins processing the data illustrated schematically in FIG. 9 such that the red, green and blue data from each pixel in each scan line is correlated as shown in FIG. 10. This correlated data is then stored in another memory device 75 and the dynamic memory 74 is free to receive data from the next band portion 92 of the object 14.

Referring again to FIG. 8, after completion of the blue scan indicated at 43B1, the scan line is displaced in direction 45 to a position 120 just before the beginning of the second band 92 and the above described sequence is then repeated for the second band 92. This same sequence is repeated through each of the remaining bands in the scan path until reaching the end 17, FIG. 6, of the scan path at which point the scan is complete and data representative of a color component image of the entire object 14 has been collected and stored in data storage as indicated at 75 in FIG. 7. The data storage device 75 may comprise, for example, a floppy disk, a hard disk, an optical disk or any other desired storage device.

The operation of the control system in another embodiment of the invention in which data input from the document takes place when the scan line 13 is moving in both the primary scan direction 43 and the secondary scan direction 45 will now described with reference to FIGS. 12–13B.

Figure 13A:
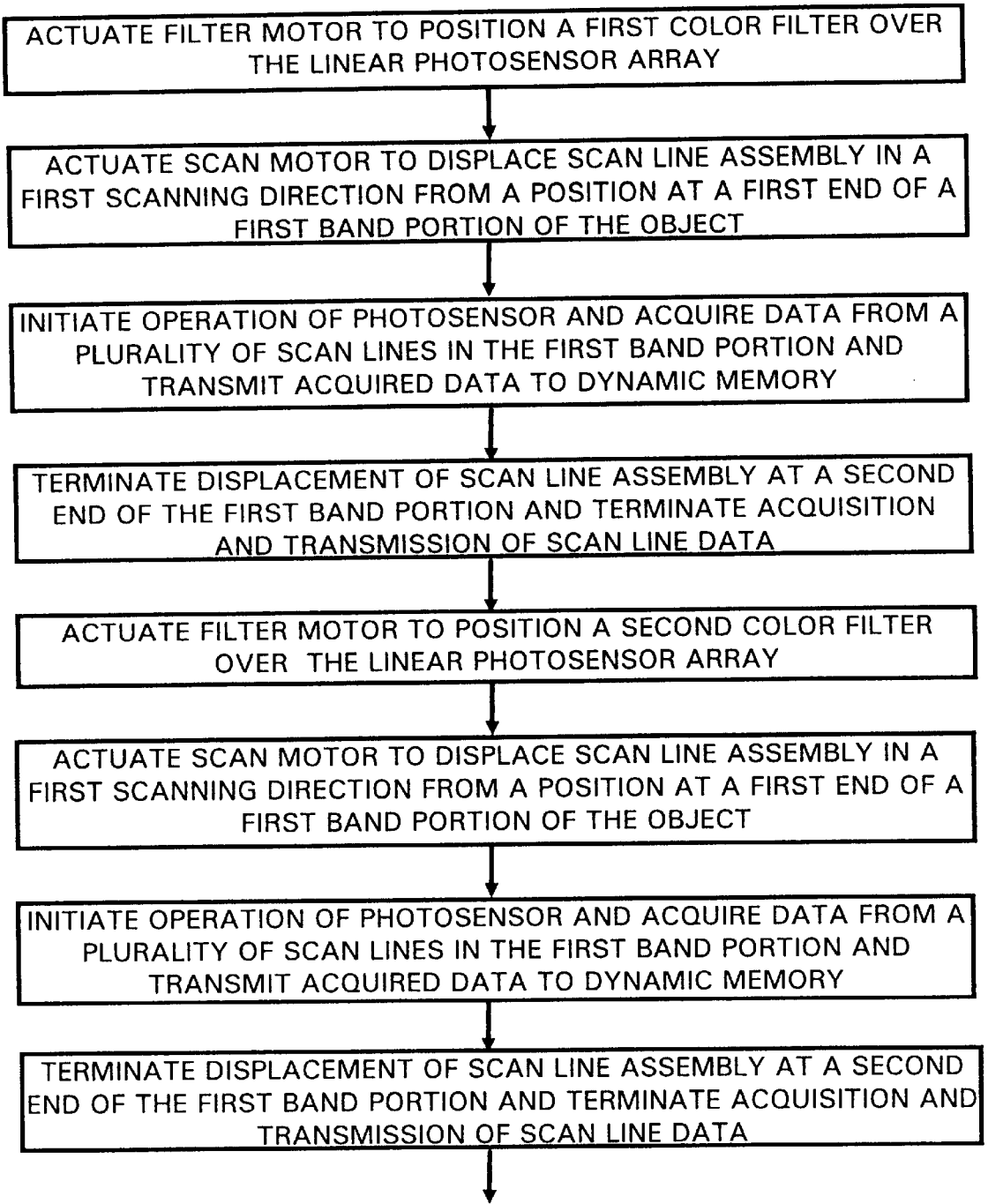
FIG. 13A is a flow chart illustrating the basic operations performed by the data processor of FIG. 7 in a scanning operation of the type illustrated in FIG. 12.
Figure 13B:
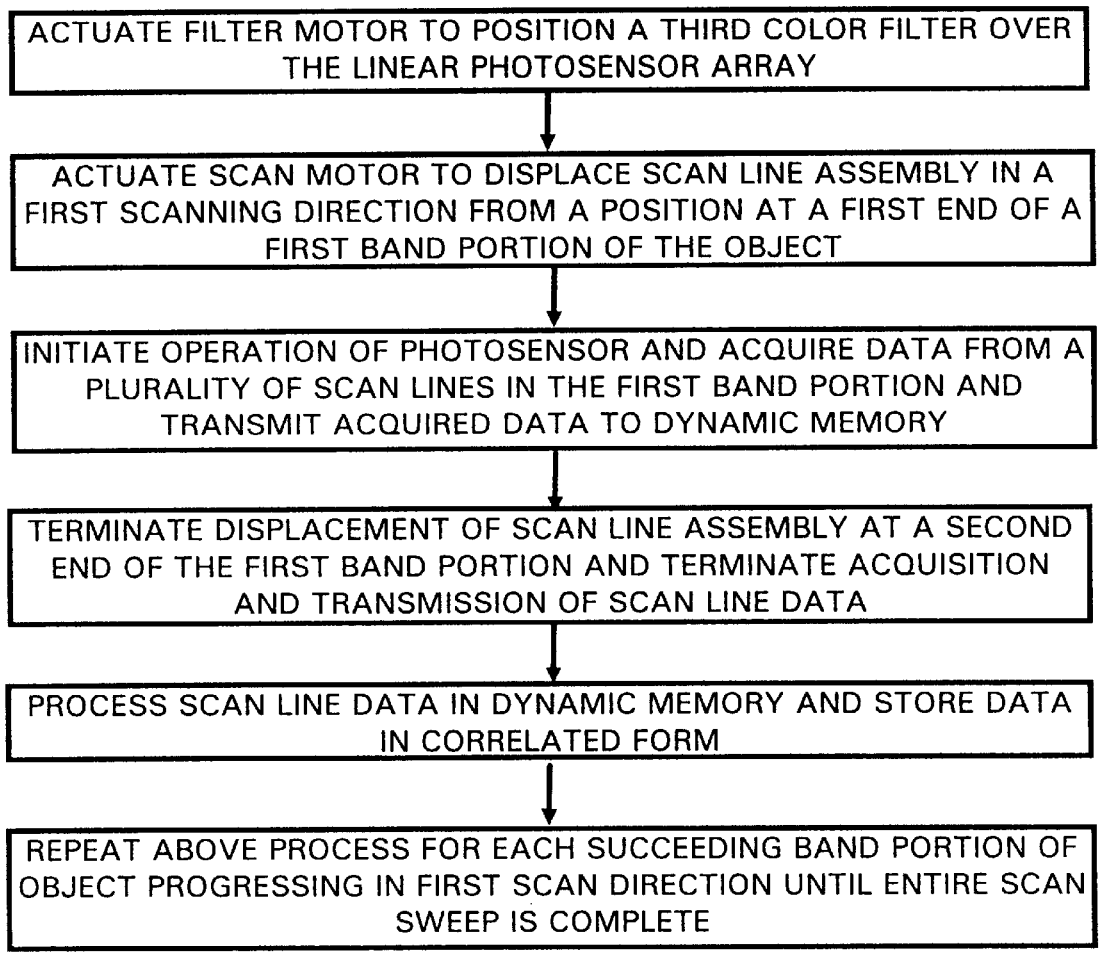
FIG. 13B is a continuation of the flow chart of FIG. 13A.

FIGS. 13A and 13B describe, in general, an operation in which the scan line 13 is displaced across a series of adjacent band portions 91, 92, 93 of the object 14 in a number of reciprocal scanning cycles which is equal in number to the number of color component images which are to be generated.

Figure 12:
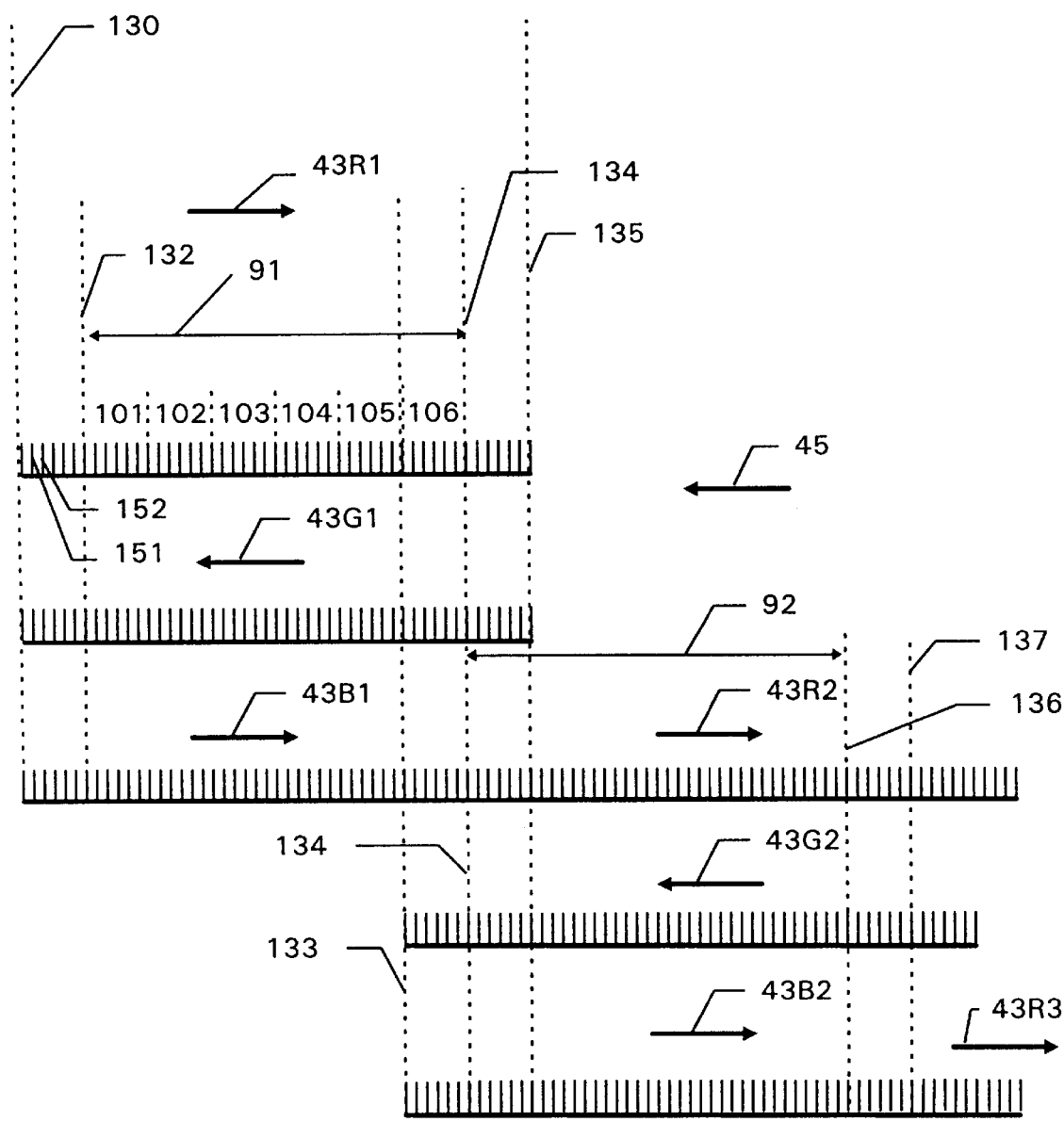
FIG. 12 is a schematic illustration showing a series of scan line reciprocal movements across two succeeding band portions of a document in which color component data is collected during scan line movement in both directions of reciprocal movement.

The data processor 74, FIG. 7, generates commands to motor 42 to displace the scan line 13 across a band portion 91 in the primary scan direction 43 during a first color component scan of the band region, e.g., a red color component scan as indicated by the reference numeral "43R1" in FIG. 12. Prior to the commencement of this color component scan indicated at "43R1", the data processor 74 actuates the filter actuator 33 to move the red filter portion 34 of the plate over the photosensor array 24, FIGS. 5 and 6. The data processor 74 also actuates the photosensor assembly 20 at the beginning of the red component scan and thus, the photosensor assembly 20 generates image data representative of a red color component image of band region 91.

At the beginning of the red sweep 43R1, the scan line 13 is positioned at a location indicated by reference numeral 130 in FIG. 12. The scan line 13 is initially positioned at a point before the beginning of first band region 91 to ensure that the scan line displacement assembly has accelerated to a constant scanning velocity before band region 91 is scanned.

As the scan line 13 moves across the first band region 91 in its red pass, as indicated at 43R1, it sends data to a dynamic memory device 74 which stores the data in an ordered array ordered by scan line and the pixels in each scan line in a manner as described previously with reference to FIG. 9

At the end of the red sweep indicated at 43R1, the scan line has moved past the first band portion of the object 134 to a location indicated by reference numeral 135 in FIG. 12.

Next, the green filter plate portion 36 is moved into position over photosensor array 24 and the photosensor assembly 20 is actuated such that data is collected during a green scanning pass as indicated at 43G1 in FIG. 8. Green scanning pass 43G1 is identical to the red pass except for the fact that a green filter rather than a red filter is positioned over the linear photosensor array and the scan line 13 is moving in the opposite direction as indicated by the arrow 43G1. At the end of the green pass, the scan line 13 has again returned to the starting point 130 and a blue pass, which is identical to the red pass except for the color of the filter, is initiated.

At the end of the blue pass, the displacement of the scan line is stopped. The scan line 13 is then moved back a small distance such that it is positioned at a location 133 in front of the second band portion 92.

At the end of the three color passes 43R1, 43G1, 43B1, data from the six scan lines in band 91 will have been stored in memory in three separate arrays with the red data stored in a first array, the green data stored in a second array, and the third data stored in a third array as represented schematically by the three planes in FIG. 9.

Once the three colored sweeps of the first band have been completed, the data processor 74 begins processing the data illustrated schematically in FIG. 9 such that the red, green and blue data from each pixel in each scan line is correlated. This correlated data is then stored in another memory device 75 and the dynamic memory 74 is free to receive data from the next band portion 92 of the object 14.

Referring again to FIG. 12, after completion of the blue scan indicated at 43B1, the scan line is displaced in direction 45 to a position 133 just before the beginning of the second band 92 extending from 134 to 136 and the above described sequence is then repeated for the second band 92 with back and forth sweeping movement between 133 and 137. This same sequence is repeated through each of the remaining bands 93, etc. in the scan path until reaching the end 17 of the scan path at which point the scan is complete and data representative of a color component image of the entire object 14 has been collected and stored in data storage as indicated at 75 in FIG. 7.

As can be appreciated, in this embodiment of the invention, less physical movement of scan line 13 is required to scan a document or other object. This allows for an overall faster scan time. However, in this embodiment, backlash and slippage in the drive motor and other mechanical components of the scan line displacement assembly make identical registration between each of the color scans of a particular band problematic, i.e., scans made in a primary scan direction 43 may not be in proper registration with scans made in secondary registration direction 45 unless registration mark sensing is used to establish a boxed reference position, particularly in an open loop system. Thus, in embodiments where scanning takes place in both directions 43, 45, it is particularly desirable to employ a registration mark sensor 39 to determine the beginning and end of each band, e.g., 92 which is being scanned.

The optical scanner device 10 has so far been described with respect to a scanning device in which the object to be scanned 14 remains stationary and the scan bar moves to acquire the image data. The optical scanner device previously described may, however, alternatively be used with a scroll feed type scanner in which the scan bar remains stationary while a system of mechanical rollers moves the document to be scanned past the scan bar.

Figure 14:
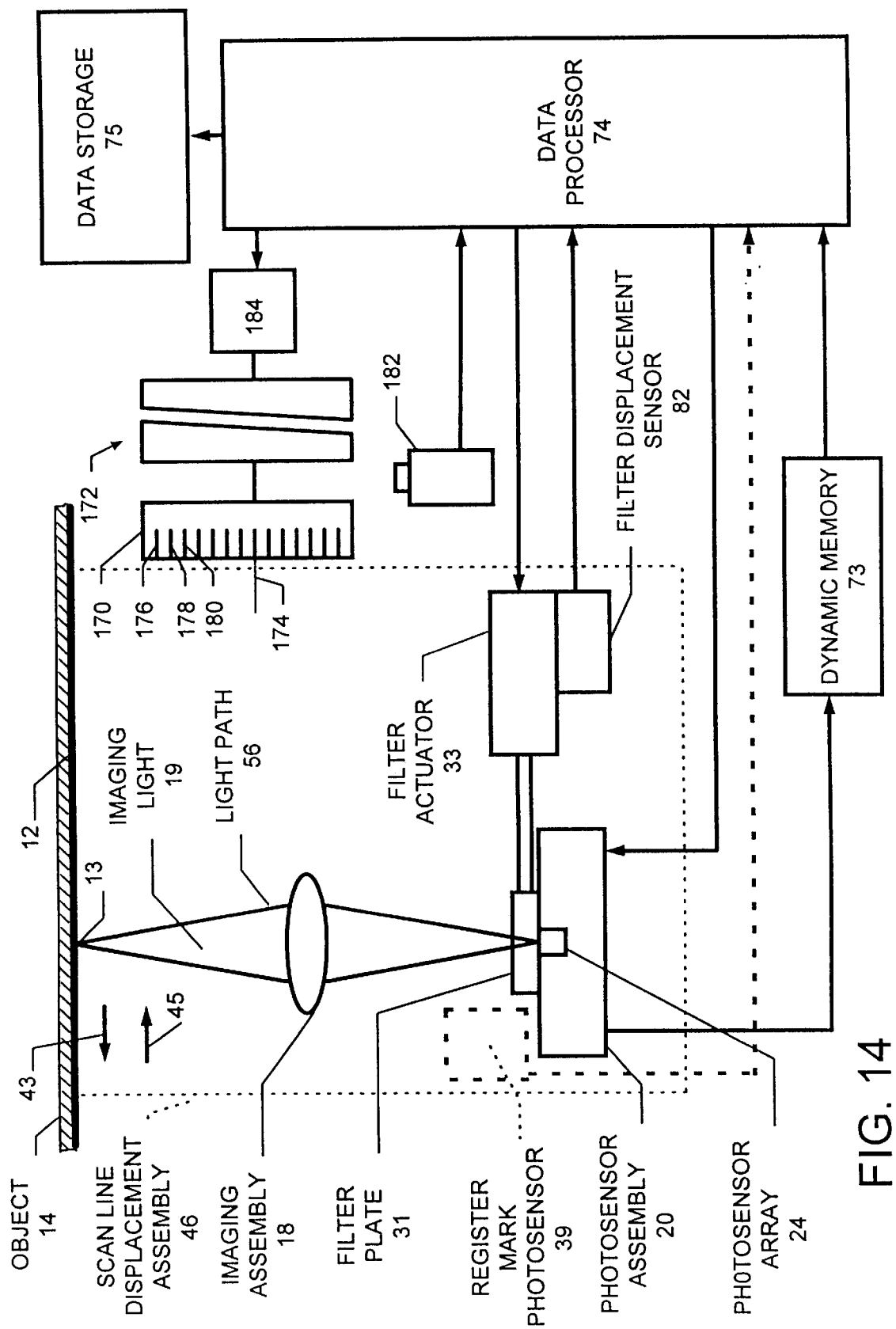
FIG. 14 is a schematic illustration of a control system for an optical scanner device.

The control system for the optical scanner device used with a scroll feed type scanner is schematically illustrated in FIG. 14. FIG. 14 is, in most respects, identical to FIG. 7 which has been previously described with respect to the moving scan bar scanner device. In the scroll feed control system of FIG. 14, however, the scan line displacement assembly drive motor 42 and the scan line displacement sensor 76 of FIG. 7 have been adapted for the scroll feed type scanner as will now be described.

Referring to FIG. 14, a wheel 170 may be attached to the paper feed roller 172 of a scroll feed type scanner. Feed roller 172 is used to feed the document or other object 14 to be scanned into the scanning device and past the scan line 13. The wheel 170 is mounted for rotation about the axis 174 along with the roller 172. A series of indicia marks such as 176, 178 and 180 are provided on the outer surface of wheel 170.

An indicia sensor 182 is located so as to sense the indicia 176, 178, 180, etc. as the roller 172 and wheel 170 turn. As the wheel 170 turns, the indicia sensor 182 sends a signal to the data processor 74 indicative of the amount of rotation of wheel 170 and roller 172. Since the circumference of the roller 172 is known, the signal from the sensor 182 can be directly correlated to the location of the document 14 with respect to the scan line 13.

As shown schematically in FIG. 14, the roller 172 is driven by drive motor 184. Drive motor 184, in turn, is controlled by a signal from microprocessor 74. A drive motor encoder 185 may also be provided for generating a motor displacement signal which may have a finer resolution than indicia sensor 182 and which is used in combination with the indicia sensor signal for precisely controlling scroll feed displacement. Accordingly, the scanning motions previously described with respect to the moving scan line may be accomplished by moving the roller 172 and, thus the document 14, in a scroll feed type scanner.

The previously described optical scanner device 10 may also be used with a moving flat bed type scanner. As previously described, in a moving flat bed scanner, an object is placed on a transparent plate and a scan bar is positioned below the plate and object. In this type of scanner, the scan bar remains stationary and the plate and the object supported on it are moved in order to move the scan line across the document.

To use the previously described optical scanner device 10 with a moving flat bed scanner, a system as shown in FIG. 7 may be employed. Sensor 76 may be attached to any of the rotating drive mechanisms associated with the moving bed of the moving flat bed scanner and/or register mark sensor 39 may be stationarily positioned below the moving bed. In this manner, signals may be sent to microprocessor 74 which are indicative of the relative displacement between the moving bed and the stationary scan bar.

The previously described optical scanner device 10 may also be used with a stationary flat bed scanner which has a scroll feed automatic document feeder option as previously described. When such an automatic document feeder option is used, the scan bar moves to a precisely defined location under the document feeder and remains stationary. During scanning, the document feeder moves the document past the scan bar in the same manner as a scroll feed scanner.

In such a device, the motions described previously may be accomplished by a combination of the movement of the paper by the automatic document feeder and the movement of the scan bar. For example, the back and forth reciprocal motion previously described could be accomplished by moving the feed wheel back and forth. Alternatively, the reciprocal motion could be accomplished by the moving scan bar while the feed wheel moves in only one direction to advance the document.

It is contemplated that the inventive concepts herein described may be variously otherwise embodied and it is intended that the appended claims be construed to include alternative embodiments of the invention except insofar as limited by the prior art.

What is claimed is:

1. A method of generating data from imaging light imaged on a photosensor array representative of a color image of a scanned object comprising the steps of:
   a) displacing a scan line relative to said scanned object from a first end to a second end of a scanning path through a plurality of reciprocal movements in each of a plurality of segments of said scanning path; and
   b) changing the color of imaging light which is imaged on said photosensor array in accordance with said reciprocal movements.

2. The method of claim 1 further comprising the step of storing data generated from imaging light from a single scanning path segment in an ordered array based upon said reciprocal movements.

3. The method of claim 1 further comprising the step of sequentially storing and removing from a memory device data from a plurality of scanning path segments collected during a single scanning cycle during which said scan line moves from said first end to said second end of said scanning path.

4. The method of claim 1 further comprising the step of detecting the position of said scan line.

5. The method of claim 4 wherein said step of detecting the position of said scan line includes the steps of:
   a) providing registration indicia spaced along said scanning path in association with said scanning path segments; and
   b) detecting said registration indicia.

6. The method of claim 4 wherein said step of detecting the position of said scan line includes sensing scan line displacement.

7. The method of claim 5 wherein said step of detecting the position of said scan line includes sensing scan line displacement.

8. The method of claim 1 wherein said scan line is displaced in a first and a second direction to accomplish said reciprocal movements and data from said imaging light is acquired only during movement of said scan line in one of said first and second directions.

9. The method of claim 1 wherein said scan line is displaced in a first and a second direction to accomplish said reciprocal movements and data from said imaging light is acquired during movement of said scan line in both said first and second directions.

10. The method of claim 1 wherein said scan line is displaced in a first and a second direction to accomplish said reciprocal movement and data from a different color of imaging light is acquired during separate ones of said displacements in said first and second directions.

11. A method of generating data from imaging light imaged on a photosensor array representative of a color image of a scanned object located along a scanning path comprising the steps of:
   a) dividing said scanning path into a first segment and at least one remaining segment;
   b) collecting data from said photosensor array representative of a first color monochrome image of said first segment by imaging a plurality of scan lines in said first segment;
   c) collecting data from said photosensor array representative of at least a second color monochrome image of said first segment by imaging said plurality of scan lines in said first segment;
   d) combining said data representative of said first monochrome image and said data representative of at least said second monochrome image into a data set that is representative of a polychrome image of said first segment; and
   e) repeating the above steps for each of said at least one remaining segment to obtain a plurality of data sets that are collectively representative of a polychrome image of said object.

12. The method of claim 11 wherein said steps of collecting data include displacing a scan line from a first end to a second end of each of said segments.

13. The method of claim 11 wherein said steps of collecting data include storing data from each segment in an ordered array.

14. The method of claim 12 further comprising the step of sequentially storing and removing from a memory device data from a plurality of scanning path segments collected during a single scanning cycle during which said scan line moves from said first end to said second end of said scanning path.

15. The method of claim 12 further comprising the step of detecting the position of said scan line.

16. The method of claim 15 wherein said step of detecting the position of said scan line includes the steps of:
   a) providing registration indicia spaced along said scanning path in association with said scanning path segments; and
   b) detecting said registration indicia.

17. The method of claim 15 wherein said step of detecting the position of said scan line includes sensing scan line displacement.

18. The method of claim 16 wherein said step of detecting the position of said scan line includes sensing scan line displacement.

19. The method of claim 12 wherein said scan line is displaced in a first and a second direction within each segment and data from said imaging light is acquired only during movement of said scan line in one of said first and second directions.

20. The method of claim 12 wherein said scan line is displaced in a first and a second direction within each segment and data from said imaging light is acquired during movement of said scan line in both said first and second directions.

21. The method of claim 12 wherein said scan line is displaced in a first and a second direction within each segment and data from a different color of imaging light is acquired during separate ones of said displacements in said first and second directions.

22. A color optical scanner device capable of generating data from imaging light imaged on a photosensor array representative of a color image of a scanned object comprising:
   a) a scanning path having a plurality of segments therealong; and
   b) a scan line assembly movable relative to said scanned object along said scanning path in a series of reciprocal movements within each segment.

23. The color optical scanner device of claim 22 further comprising a memory device capable of storing data generated from imaging light from a single scanning path segment in an ordered array based upon the reciprocal movements of said scan line assembly.

24. The color optical scanner device of claim 22 further comprising a scanning path segment position detector.

25. The color optical scanner device of claim 24, said scanning path segment position detector comprising:

registration indicia spaced along said scanning path in association with said scanning path segments; and registration indicia detector apparatus.

26. The color optical scanner device of claim 24, said scanning path segment position detector comprising a scan line assembly displacement sensor.

27. The color optical scanner device of claim 25, said scanning path segment position detector comprising a scan line assembly displacement sensor.

28. The color optical scanner device of claim 22, said scan line assembly being displaced in a first and a second direction during each of said reciprocal movements in each of said plurality of segments of said scanning path, data from imaging light being acquired only during movement of said displacement assembly in one of said first and second directions.

29. The color optical scanner device of claim 22, said scan line displacement assembly being displaced in a first and a second direction during each of said reciprocal movements in each of said plurality of segments of said scanning path, data from imaging light being acquired during movement of said displacement assembly in both said first and second directions.

30. The color optical scanner device of claim 22, said scan line assembly being displaced in a first and a second direction during each of said reciprocal movements, data from a different color of imaging light being acquired during separate ones of said displacements in said first and second directions.

* * * * *